United States Patent
Shinozaki et al.

(10) Patent No.: US 7,428,409 B2
(45) Date of Patent: Sep. 23, 2008

(54) METHOD OF OBTAINING USER DATA TO BE TRANSMITTED TO A NETWORK SIDE, AND A RADIO CONTROL BASE STATION

(75) Inventors: Masayuki Shinozaki, Kanagawa (JP); Yukinori Koba, Kanagawa (JP)

(73) Assignee: Evolium S.A.S., Paris (FR)

( * ) Notice: Subject to any disclaimer, the term of this patent is extended or adjusted under 35 U.S.C. 154(b) by 748 days.

(21) Appl. No.: 10/931,972

(22) Filed: Sep. 2, 2004

(65) Prior Publication Data
US 2005/0085213 A1    Apr. 21, 2005

(30) Foreign Application Priority Data
Sep. 4, 2003    (JP) .............................. 2003-312153

(51) Int. Cl.
*H04Q 7/20* (2006.01)
*H04M 11/00* (2006.01)

(52) U.S. Cl. ........................ 455/403; 455/524; 455/513

(58) Field of Classification Search .................. 455/62, 455/403, 524, 525, 513, 550.1, 556.1, 556.2
See application file for complete search history.

(56) References Cited

FOREIGN PATENT DOCUMENTS

EP    1128703 A1 *    8/2001

OTHER PUBLICATIONS

"Universal Mobile Telecommunication System (UMTS); UTAN Iur and Iub interface under plane protocols for DCH data streams (#GPP TS 25.427 version 5.1.0 Release 5); ETSI TS 125 427", Dec. 2002, ETSI Standards, Eurpoean Telecommunications Standards Institute, Sophio-Antipo, FR, XP014009131 ISSN: 0000-0001).*

* cited by examiner

*Primary Examiner*—Melur Ramakrishnaiah
(74) *Attorney, Agent, or Firm*—Sughrue Mion, PLLC

(57) ABSTRACT

To provide a method of obtaining user data to be transmitted to a network side, which can simplify the processing for selecting and combining optimum user data from user data including a transport block transmitted from the same mobile terminal, to minimize a delay. The method comprises a step of numerically expressing a plurality of parameters in the protocol used at the time of transmitting the user data; a step of obtaining values of evaluation parameters by adding the plurality of numerically expressed parameters; a step of selecting an optimum transport block based on the obtained values of the evaluation parameters; and a step of obtaining user data to be transmitted to the network side, by combining the selected optimum transport blocks.

5 Claims, 5 Drawing Sheets

METHOD OF OBTAINING USER DATA TO BE TRANSMITTED TO A NETWORK SIDE, AND A RADIO CONTROL BASE STATION

TECHNICAL FIELD

The present invention relates to a method of obtaining user data to be transmitted to a network side, and a radio control base station. More specifically, the present invention relates to a method of obtaining user data to be transmitted to a network side having a switching system, in which a radio control base station receives user data including a transport block transmitted corresponding to an Iub frame protocol of the UMTS (Universal Mobile Telecommunication System) Standard from the same mobile terminal, via a plurality of radio base stations, selects and combines the transport blocks in the received user data, to obtain user data to be transmitted to the network side, and a radio control base station that executes the method of obtaining user data to be transmitted to the network side. The invention is based on a priority application JP 2003-312153 which is hereby incorporated by reference.

BACKGROUND ART

The specification of a mobile communication system using the CDMA (Code Division Multiple Access) method has been established as a mobile phone system of the third generation (IMT 2000), and the service has been started globally.

Characteristic functions of the mobile communication system using the CDMA method are a power control function and a handover function. By allowing these two functions to interact with each other, comfortable mobile communication environment (service) can be provided to the system subscribers, and carriers can accommodate more subscribers.

However, the mobile communication system using the CDMA method has a more complicated protocol, as compared with the mobile communication systems (TDMA (time-division multiplex access), FDMA (frequency division multiplex access), analog) of the second generation or before. Therefore, both the mobile terminal side and the base station side require the processing capability for a huge protocol. In order to solve this problem, progress in the semiconductor technique and the radio technique are essential. Accordingly, an increase in the circuit size and speed-up of the processing clock for improving the processing speed are required, and hence it is also necessary to improve the processing performance of the software for the protocol processing.

When services requiring real time, such as speech communication and videophone, are to be provided, it is necessary to minimize the transmission delay of data on the network.

As a factor contradicting the requirement for minimizing the transmission delay, there can be mentioned handover processing on the base station side. In the handover processing, the radio control base station compares user data including a transport block from the same mobile terminal received by a plurality of radio base stations (nodes B) by using a plurality of parameters indicating the radio state of the received user data, to select and combine optimum transport blocks from the received user data.

The radio control base station takes into consideration the possibility that there is a reception time difference between user data received from the same mobile terminal by the respective radio base stations, and stores the received respective user data and the parameters for the user data in a memory, to read it and perform processing afterwards. The processing, that is, comparison and branching processing in a plurality of stages are performed by using a software unit or a comparator, being a hardware unit. However, by such processing, a transmission delay may occur against the requirement for minimizing the transmission delay of the user data on the network.

FIG. 4 illustrates the overall configuration of a mobile communication system in which the method of obtaining user data to be transmitted to a network side is executed by selecting and combining user data including a transport block transmitted from the same mobile terminal.

As shown in FIG. 4, the mobile communication system comprises mobile terminals 1 carried by users, a plurality of radio base stations (nodes B) 2 which communicate with the mobile terminals 1, and a radio control base station (RNC) 3 which controls the plurality of radio base stations 2.

The radio control base station 3 comprises a user data reception processing section 31 for receiving user data including a transport block from the radio base station 2, and a selection and combination processing section 32 for selecting and combining user data transmitted from the same mobile terminal, which has been received via the radio base station 2, to obtain the user data to be transmitted to the network side.

The user data transmitted from the same mobile terminal 1 is received by a plurality of radio base stations 2. The user data transmitted from the same mobile terminal 1 and received by the respective radio base stations 2 is transmitted to the radio control base station 3, by using the Iub for communication protocol (Iub frame protocol). The radio control base station 3 selects and combines optimum transport blocks from these user data transmitted from the same mobile terminal 1, and transmits the combined user data to a core network (CN) side by using the Iu.

Conventionally, the radio control base station 3 uses a plurality of parameters in the Iub frame protocol to select a transport block included in the user data from the same mobile terminal 1, to obtain the user data to be transmitted.

The plurality of parameters in the Iub frame protocol includes parameters of the types described below. These parameters are based on TS25.427 in the 3GPP Standard.

(a) Header CRC

A parameter for deciding whether the header part of the Iub frame protocol is normal, that is, a parameter indicating the transmission condition in the network.

(b) Frame Type

A parameter indicating whether the Iub frame is a user data frame or a control frame.

(c) CFN (Connection Frame Number)

A connection frame number set between a mobile terminal and the radio base station, which is a parameter for indicating the frame order.

(d) TFI (Transport Format Indicator)

A parameter set at the time of call setting, and a parameter for deciding the type of user data transmitted from a mobile terminal. More specifically, it is a parameter indicating the number of the transport blocks and the size of the transport blocks.

(e) Transport Block

A parameter indicating the user data transmitted from a mobile terminal.

(f) Estimated Quality (QE)

A parameter indicating the bit error rate in the received data received by the radio base station.

(g) CRCI

A parameter indicating whether the CRC on the radio for each transport block, attached to the received data received from the mobile terminal by the radio base station, is normal.

When a plurality of branches exists (that is, when a plurality of radio base stations receive the user data from the same mobile terminal), user data having the same CFN has been the object of selection and combination.

FIG. 5 is a flowchart for explaining the conventional processing operation by the radio control base station, which selects and combines user data including a transport block transmitted from the same mobile terminal, by using the plurality of parameters.

At step X1, it is verified whether the header CRC of the Iub frame protocol is normal, with respect to the user data received by a plurality of branches (a plurality of radio base stations 2 having received the user data from the same mobile terminal 1). If the header CRC is not normal, control proceeds to step X14, to annul the frame. On the other hand, if the header CRC is normal, control proceeds to step X2.

At step X2, it is verified whether the frame type is a user data frame or a control frame. When the frame type is the control data frame, control proceeds to step X15, to perform terminal processing of the control frame, and remove the branch from the objects to be selected and combined. On the other hand, when the frame type is the user data frame, control proceeds to step X3, to temporarily store the respective transport blocks (TB) and the respective parameters in the Iub frame protocol in a buffer.

At step X4, CFN frames (frames in respective branches to be combined) of the same timing received from the same mobile terminal 1 is read from the buffer, and at step X5, a branch having the normal payload CRC is selected.

At step X6, it is verified whether there is a plurality of selected branches having the normal payload CRC. If there is only one branch having the normal payload CRC, control proceeds to step X21, to select the branch and obtain the user data to be transmitted, and the obtained user data is transmitted. On the other hand, if there is a plurality of branches having the normal payload CRC, control proceeds to step X7.

At step X7, it is determined whether the number and the size of the transport block in each branch are the same, by the TFI in the Iub frame protocol. If not, control proceeds to step X16, and if yes, control proceeds to step X8.

At step X8, it is verified whether the number of branches in which the CRCI is OK is plural or single for each transport block. If there is only one branch in which the CRCI is OK, control proceeds to step X13, to select the branch to obtain the user data to be transmitted, and the obtained user data is transmitted. On the other hand, if there is a plurality of branches in which the CRCI is OK, control proceeds to step X10.

At step X10, it is verified in each branch whether the bit error rate (QE) is the same. If not, control proceeds to step X12, to select a branch having a lower bit error rate, and control proceeds to step X13. On the other hand, if the bit error rate is the same, control proceeds to step X1, to select a branch optionally, and control proceeds to step X13.

At step X13, the transport blocks of the selected branches are combined, to obtain user data to be transmitted to the network side having a switching system, and the obtained user data is transmitted to finish the processing.

At step X16, to which control proceeds when the number and the size of the user data in each branch is not the same, all transport blocks in the branches where the first CRCI in each branch is OK are selected.

At step X17, it is verified whether the number of branches in which the first CRCI is OK is plural. If there is only one branch in which the first CRCI is OK, control proceeds to step X21, to select the branch to obtain the user data to be transmitted, and the obtained user data is transmitted. On the other hand, if there is a plurality of branches in which the first CRCI is OK, control proceeds to step X18.

At step X18, it is verified whether the bit error rate (QE) in each branch in which the first CRCI is OK is the same. If not, control proceeds to step X20, to select a branch having a lower bit error rate, and control proceeds to step X21, to select the branch to obtain the user data to be transmitted, and the obtained user data is transmitted. On the other hand, if the bit error rate is the same in each branch, control proceeds to step X19, to select a branch optionally to obtain the user data to be transmitted, and the obtained user data is transmitted.

As described above, the conventional processing performed by the radio control base station in order to obtain the user data to be transmitted to the network side, in which optimum transport blocks are selected and combined from user data including transport blocks transmitted from the same mobile terminal, is complicated processing, wherein there are lots of comparison processing steps, thereby causing a transmission delay.

DISCLOSURE OF THE INVENTION

Problem to be Solved by the Invention

It is an object of the present invention to provide a method of obtaining user data to be transmitted to the network side, which can simplify the processing of the radio control base station that selects and combines optimum user data from user data including a transport block transmitted from the same mobile terminal corresponding to the Iub frame protocol of the UMTS Standard, and can minimize a delay of the user data to be transmitted to the network side having a switching system. Moreover, it is an object of the present invention to provide a radio control base station which executes such a method.

Means of Solving the Problems

In order to solve the problems, the method of obtaining user data to be transmitted to the network side according to the present invention is a method of obtaining user data to be transmitted to a network side having a switching system, in which a radio control base station receives user data including a transport block transmitted from the same mobile terminal corresponding to an Iub frame protocol of the UMTS Standard, via a plurality of radio base stations, selects and combines the transport blocks in the received user data, to obtain user data to be transmitted to the network side, comprising:

a step of numerically expressing for each transport block a plurality of parameters in the protocol respectively used when the radio base station transmits the user data;

a step of obtaining a value of an evaluation parameter indicating the communication quality for each transport block, by adding the plurality of numerically expressed parameters;

a step of selecting an optimum transport block based on the obtained values of the evaluation parameters; and a step of obtaining user data to be transmitted to the network side, by combining the selected optimum transport blocks.

With a method having such a configuration, an optimum transport block can be selected based on the values of the obtained evaluation parameters, being the only one parameter. As a result, comparison in a plurality of stages, which has been heretofore required, is not necessary, and hence a delay occurring at the time of selecting and combining the transport block can be minimized.

In the method of obtaining the user data to be transmitted to the network side according to the present invention, the plurality of parameters are an operation result of a payload CRC in the respective user data, an operation result of a CRCI for each transport block, and a bit error rate in the respective user data.

With a method having such a configuration, the value of the evaluation parameter obtained by adding numerically expressed the plurality of parameters can appropriately indicate the communication quality of the user data. As a result, a transport block having the optimum communication quality can be selected as the user data to be transmitted to the network side.

In the method of obtaining user data to be transmitted to the network side according to the present invention, at the step of obtaining the value of the evaluation parameter, the value of the evaluation parameter is obtained by adding the bit error rate in the user data, a value obtained by multiplying a value, which expresses numerically the operation result of the payload CRC in the user data, by a weighting coefficient, and a value obtained by multiplying a value, which expresses numerically the operation result of the CRCI for each transport block, by a different weighting coefficient.

With a method having such a configuration, by multiplying the respective numerically expressed parameters by the weighting coefficient corresponding to the influence affecting the communication quality, the value of the evaluation parameter agreeing with the actual transmission quality can be obtained, taking into consideration the magnitude of the influence of the respective parameters with respect to the evaluation parameter.

In the method of obtaining user data to be transmitted to the network side according to the present invention, when the number of the transport blocks included in the user data transmitted from the same mobile terminal is different corresponding to the receiving radio base station, at the step of obtaining the value of the evaluation parameter, the maximum number of the transport blocks is designated as the number of the transport blocks, and the value same as the evaluation parameter of the first transport block in the user data having an unincluded transport block is designated as the value of the evaluation parameter of said unincluded transport block.

With a method having such a configuration, even when the number of the transport blocks included in the user data transmitted from the same mobile terminal is different corresponding to the receiving radio base station, an appropriate evaluation parameter value can be obtained.

In order to solve the above problems, the radio control base station according to the present invention is a radio control base station that receives user data including a transport block transmitted from the same mobile terminal corresponding to an Iub frame protocol of the UMTS Standard, via a plurality of radio base stations, selects and combines the transport blocks in the received user data, for obtaining user data to be transmitted to a network side having a switching system, comprising:

a numerically expressing unit which expresses numerically for each transport block a plurality of parameters in the protocol respectively used when the radio base station transmits the user data;

an evaluation parameter determination unit which obtains a value of the evaluation parameter indicating the communication quality for each transport block, by adding the plurality of parameters numerically expressed by the numerically expressing unit;

a transport block selection unit which selects the optimum transport block based on the values of the evaluation parameters obtained by the evaluation parameter determination unit; and a transport block combining unit which obtains user data to be transmitted to the network side, by combining the optimum transport blocks selected by the selection unit.

By the radio control base station having such a configuration, the processing for selecting and combining the user data including the transport block transmitted from the same mobile terminal can be simplified, and as a result, a radio control base station that can minimize a delay of the user data can be provided.

The best mode of the method of obtaining the user data to be transmitted to the network side and the radio control base station that executes the method will be described in detail, with reference to the drawings.

BEST MODE FOR CARRYING OUT THE INVENTION

The mobile communication system to which the present invention is applied is the same as the mobile communication system described with reference to FIG. 4, wherein the mobile communication system comprises mobile terminals 1, radio base stations 2, and a radio control base station 3.

The user data transmitted from the same mobile terminal 1 is received by a plurality of radio base stations 2. The user data received by the respective radio base stations 2 is transmitted to the radio control base station 3, by using the Iub for communication protocol (Iub frame protocol). The radio control base station 3 receives the user data from the radio base station 2 via the user data reception processing section 31, selects and combines optimum transport blocks from the received user data by the selection and combination processing section 32, and transmits the combined user data to a core network (CN) side by using the Iu.

The method of obtaining the user data to be transmitted to the network side, executed by the selection and combination processing section 32 in the radio control base station 3 will be explained, with reference to FIG. 1.

At step S1, it is verified whether the header CRC of the Iub frame protocol is normal, with respect to the user data received by a plurality of branches (a plurality of radio base stations 2 having received the user data from the same mobile terminal 1). If not, control proceeds to step S11, to annul the frame. If the header CRC is normal, control proceeds to step S2.

At step S2, it is verified whether the frame type is a user data frame or a control frame. When the frame type is the control frame, control proceeds to step S12, to perform terminal processing of the control frame, and remove the branch from the objects to be selected and combined. On the other hand, when the frame type is the user data frame, control proceeds to step S3.

At step S3, a value of the evaluation parameter P is calculated. The calculation method is such that OK/NG, being the operation result of the payload CRC, is numerically expressed for each transport block in the branch, and OK/NG, being the operation result of the CRCI, is numerically expressed, which are added to the bit error rate (QE). Adding may be performed after multiplying these by a weighting coefficient, taking into consideration the influence of respective parameters with respect to the evaluation parameter P.

At step S4, the respective transport blocks and the evaluation parameters P relating to the transport blocks are stored in the buffer temporarily.

At step S5, CFN frames of the same timing transmitted from the same user (frames in respective branches to be combined) are read from the buffer.

At step S6, it is verified whether the number and the size of the transport blocks are the same, by the TFI in the Iub frame protocol. If not, control proceeds to step S13, and a value same as the evaluation parameter value of the first transport block is designated as the value of the evaluation parameter P in an unincluded transport block, and control proceeds to step S7. On the other hand, if the number and the size of the transport blocks are the same, control proceeds to step S7 directly.

At step S7, a transport block having a good value of the evaluation parameter P (that is, the value of the evaluation parameter P is the smallest) is selected, in a unit of transport block for each branch.

At step S8, it is verified whether there is a plurality of transport blocks having the good value of the evaluation parameter P, selected at step S7. If there is only one transport block, control proceeds to step S10, where the transport blocks are combined to obtain user data to be transmitted, and the obtained user data is transmitted. On the other hand, if there is a plurality of transport blocks, control proceeds to step S9, to select an optional transport block. At step S10, the selected transport blocks are combined to obtain user data to be transmitted, and the obtained user data is transmitted.

The selection and combination processing section 32 performing such processing comprises a numerically expressing unit, an evaluation parameter determining unit, a transport block selecting unit, and a transport block combining unit, which are not shown.

These units included in the selection and combination processing section 32, and the correspondence with each step shown in FIG. 1 are as described below. That is, the numerically expressing unit and the evaluation parameter determining unit correspond to step S3, the transport block selecting unit corresponds to steps S6 to S9, and the transport block combining unit corresponds to step S10.

FIG. 2 illustrates an example in which values of the evaluation parameters P for the user data including transport blocks TB1 to TB3 transmitted from the same mobile terminal and received via three branches are obtained, and an optimum transport block is selected based on the values of the obtained evaluation parameters P.

The example shown in FIG. 2 indicates an example in which there are user data received via three branches (three radio base stations 2), the header CRCs in the user data transmitted from these branches are normal, and the values of TFI in the respective branches agree with each other.

Here, the calculation method of the evaluation parameter P is as follows.

(1) If the operation result of the payload CRC is OK, a value obtained by multiplying 0 by a weighting coefficient $W_1$ is used. If the operation result of the payload CRC is NG, a value obtained by multiplying FF (hexadecimal number) by the weighting coefficient $W_1$ is used. However, the weighting coefficient $W_1$ in this case is 1000/FF.

(2) If the operation result of the CRCI is OK, a value obtained by multiplying 0 by a weighting coefficient $W_2$ is used. If the operation result of the CRCI is NG, a value obtained by multiplying FF (hexadecimal number) by the weighting coefficient $W_2$ is used. The weighting coefficient $W_s$ in this case is 100/FF. When the CRCI has a plurality of bits, the multiplication is performed for the number of bits and added.

(3) The numerical value of QE (bit error rate) is kept as it is.

(4) The respective numerical values calculated in this manner are added, to obtain the evaluation parameter P.

The operation result of the evaluation parameter P for each of the transport blocks TB1 to TB3, with respect to the user data for each of the branches 1 to 3 in the example shown in FIG. 2 is as described below.

As for TB1 and TB3 in branch 1, since the payload CRC is OK, CRCI is also OK, and the bit error rate is 80, the value of the parameter P becomes 80, from $0 \times W_1 + 0 \times W_2 + 80$.

As for TB 2 in branch 1, since the payload CRC is OK, CRCI is NG, and the bit error rate is 80, the value of the parameter P becomes 180, from $0 \times W_1 + FF \times W_2 + 80$.

As for TB1 and TB2 in branch 2, since the payload CRC is OK, CRCI is also OK, and the bit error rate is 20, the value of the parameter P becomes 20, from $0 \times W_1 + 0 \times W_2 + 20$.

As for TB 3 in branch 2, since the payload CRC is OK, CRCI is NG, and the bit error rate is 20, the value of the parameter P becomes 120, from $0 \times W_1 + FF \times W_2 + 20$.

As for TB1 and TB3 in branch 3, since the payload CRC is NG, CRCI is OK, and the bit error rate is 20, the value of the parameter P becomes 1020, from $FF \times W_1 + 0 \times W_2 + 20$.

As for TB2 in branch 3, since the payload CRC is NG, CRCI is also NG, and the bit error rate is 20, the value of the parameter P becomes 1120, from $FF \times W_1 + FF \times W_2 + 20$.

As described above, by selecting the smallest value of the calculated parameter P, the user data to be transmitted to the network side having a switching system can be obtained. In this example, branch 2 is selected for TB1 and TB2, and branch 1 for TB3. The user data to be transmitted to the network side can be obtained by combining these selected transport blocks TB1 to TB3.

FIG. 3 is a diagram illustrating another example for selecting optimum transport block by obtaining values of the evaluation parameters P.

In the example shown in FIG. 3, the values of TFI in two branches do not agree with each other. That is, branch 1 includes three transport blocks, whereas branch 2 includes only one transport block. When the number of transport blocks does not agree with each other, values of evaluation parameters P are respectively obtained with respect to the three transport blocks, being the maximum number.

In this case, the value of the evaluation parameter P is calculated with respect to the respective transport blocks, in the same manner as in the example shown in FIG. 2.

As for TB1 and TB3 in branch 1, since the payload CRC is OK, CRCI is also OK, and the bit error rate is 80, the value of the parameter P becomes 80, from $0 \times W_1 + 0 \times W_2 + 80$.

As for TB 2 in branch 1, since the payload CRC is OK, CRCI is NG, and the bit error rate is 80, the value of the parameter P becomes 180, from $0 \times W_1 + FF \times W_2 + 80$.

As for TB1 in branch 2, since the payload CRC is OK, CRCI is also OK, and the bit error rate is 20, the value of the parameter P becomes 20, from $0 \times W_1 + 0 \times W_2 + 20$.

As for TB2 and TB3 in branch 2, since there is no transport block therefor, 20 is assigned, which is the value of the evaluation parameter P of TB1, being the first transport block in branch 2.

The smallest value of the parameters P calculated in this manner is selected. In this example, branch 2 is selected for TB1 to TB3. In this case, since there is no transport block for TB2 and TB3 in branch 2, these transport blocks TB2 and TB3 are annulled, and only the transport block TB1 of branch 2 is transmitted to the network side having the switching system.

The method of obtaining the value of the evaluation parameter P is not limited to the above example, and various methods can be considered. For example, the types of parameters in the Iub frame protocol and values of the weighting coefficients $W_1$ and $W_2$, used for obtaining the evaluation parameters, and the processing when there is no transport block are not limited to the above examples.

As is obvious from the above explanation, the optimum transport block can be selected based on the values of the evaluation parameters, which is only one parameter, according to the method of obtaining the user data to be transmitted to the network side according to the present invention. As a result, comparison in a plurality of stages heretofore required is not necessary, and hence a delay occurring at the time of selecting and combining transport blocks can be minimized.

DESCRIPTION OF REFERENCE SIGNS

Figure 1:
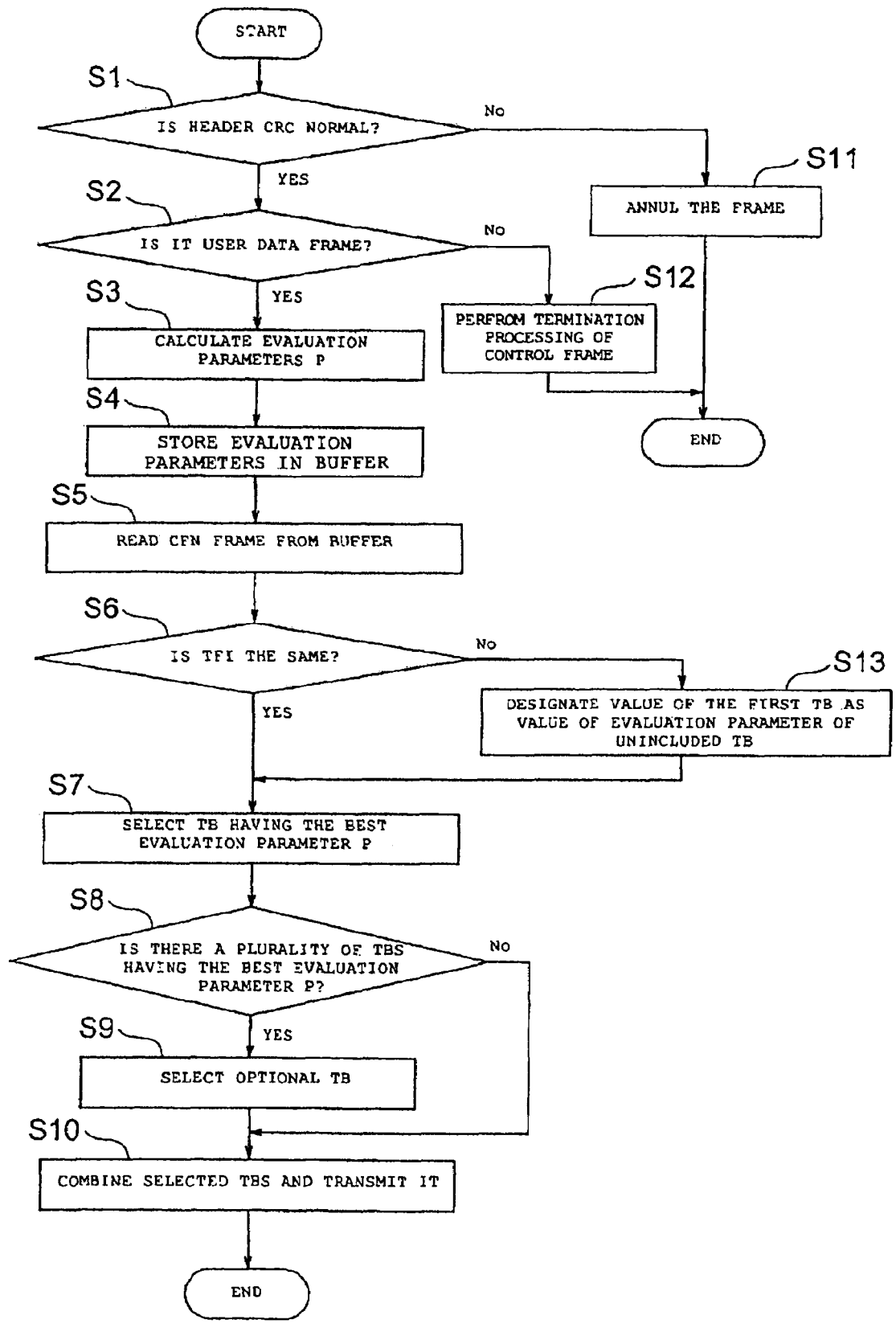
[FIG. 1A] A flowchart for explaining a method of obtaining user data to be transmitted to a network side, according to the present invention.
Figure 2:
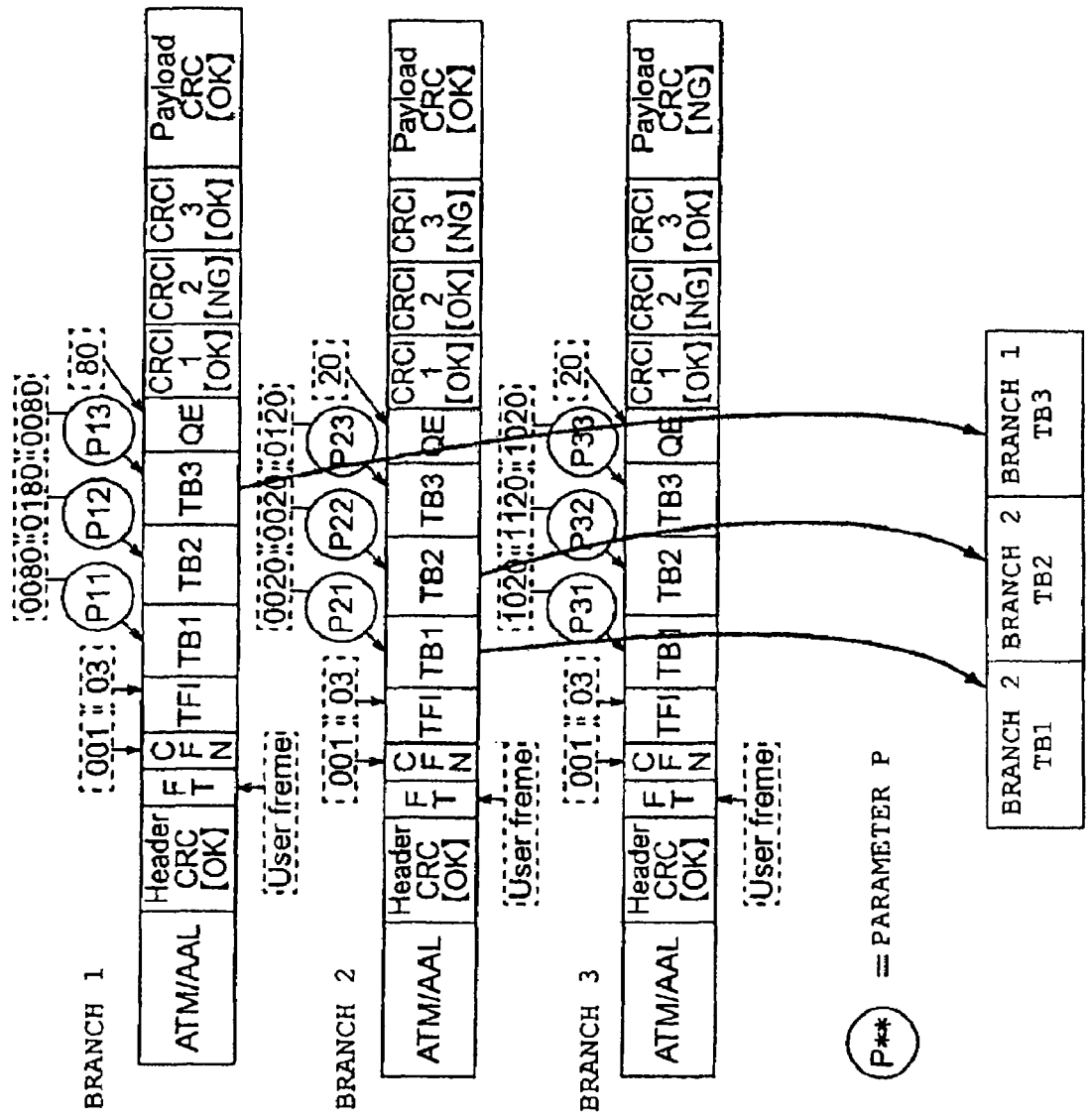
[FIG. 2] A diagram illustrating one example for selecting the optimum transport block by obtaining values of the evaluation parameters.
Figure 3:
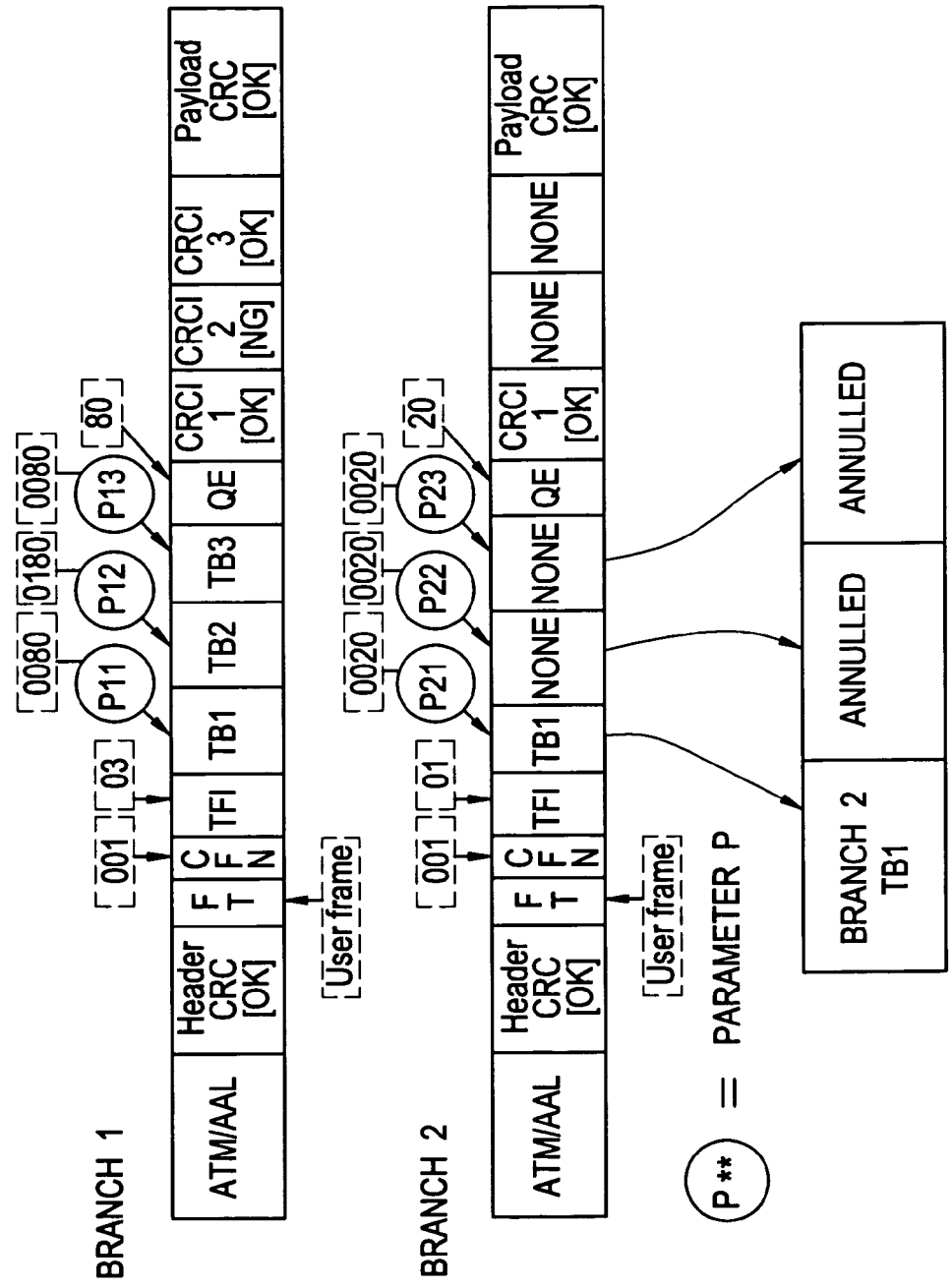
[FIG. 3] A diagram illustrating another example for selecting the optimum transport block by obtaining values of the evaluation parameters.
Figure 4:
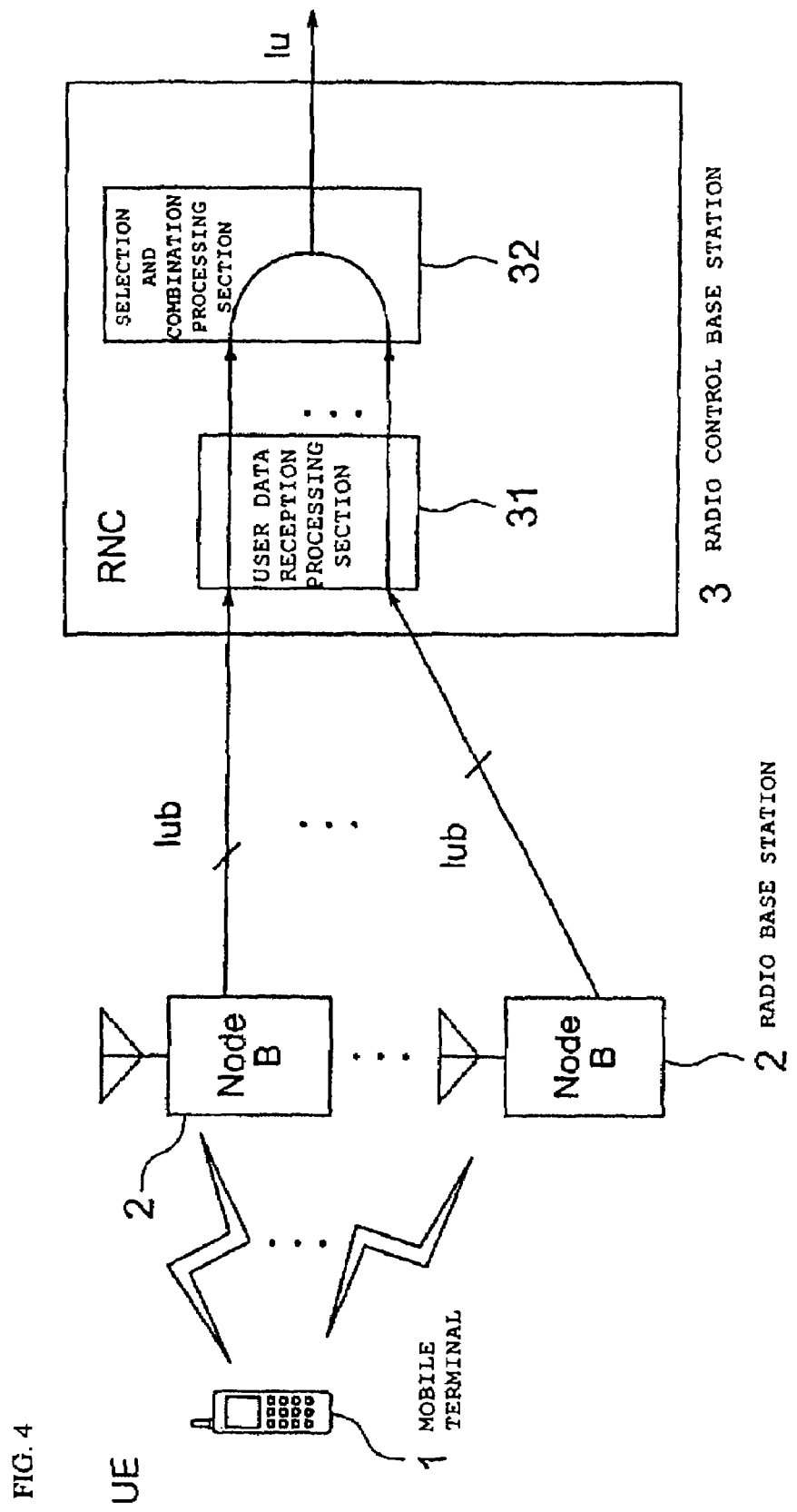
[FIG. 4] A diagram illustrating the overall configuration of a mobile communication system.
Figure 5:
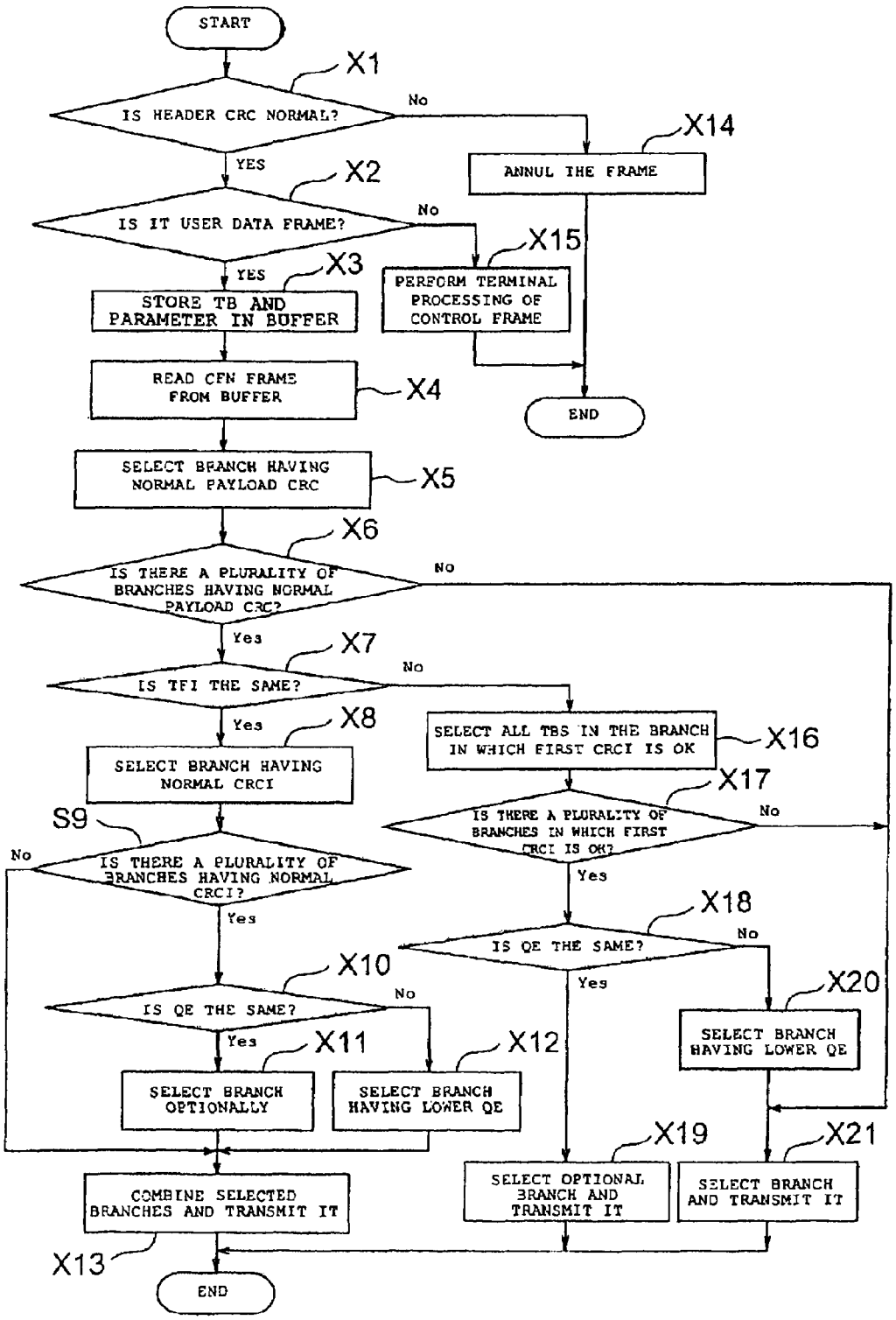
[FIG. 5] A flowchart for explaining a conventional processing operation in a radio control base station.

1 Mobile terminal
2 Radio base station
3 Radio control base station
31 User data reception processing section
32 Selection and combination processing section

The invention claimed is:

1. A method of obtaining user data to be transmitted to a network side having a switching system, the method comprising:
   receiving at a radio control base station first user data comprising a plurality of transport blocks transmitted from a same mobile terminal, based on an Iub frame protocol of a universal mobile telecommunication system (UMTS) standard, via a plurality of radio base stations:
   numerically expressing, for each of the plurality of transport blocks, a plurality of parameters of the Iub frame protocol respectively used when the radio base station transmits the user data;
   obtaining a value of an evaluation parameter indicating a communication quality for the each of the plurality of transport blocks, by adding the plurality of numerically expressed parameters, and generating;
   selecting at least one optimum transport block based on the obtained value of the evaluation parameter for the each of the plurality of transport blocks; and
   obtaining second user data to be transmitted to the network side, by combining the selected at least one optimum transport block.

2. A method of obtaining user data to be transmitted to the network side according to claim 1, wherein the plurality of parameters are an operation result of a payload cyclic redundancy checksum (CRC) in the user data, an operation result of a CRC indicator for the each of the plurality of transport blocks, and a bit error rate in the user data.

3. A method of obtaining user data to be transmitted to the network side according to claim 2, wherein in the obtaining the value of the evaluation parameter, the value of the evaluation parameter is obtained by adding the bit error rate in the user data, a value obtained by multiplying a value, which expresses numerically the operation result of the payload CRC in the user data, by a weighting coefficient, and a value obtained by multiplying a value, which expresses numerically the operation result of the CRCI for the each of the plurality of transport blocks, by a different weighting coefficient.

4. A method of obtaining user data to be transmitted to the network side according to claim 1, wherein when a number of the plurality of transport blocks included in the user data transmitted from the same mobile terminal is different corresponding to the plurality of radio base stations, in the obtaining the value of the evaluation parameter, a maximum number of the plurality of transport blocks is designated as the number of the plurality of transport blocks, and a value same as an evaluation parameter of a first transport block in the user data having an unincluded transport block is designated as a value of the evaluation parameter of the unincluded transport block.

5. A radio control base station that receives user data to be transmitted to a network side having a switching system, the radio control base station comprising:
   a numerically expressing unit which, after receiving first user data comprising a plurality of transport blocks transmitted from a same mobile terminal, based on an Iub frame protocol of a universal mobile telecommunication system (UMTS) standard, via a plurality of radio base stations, expresses numerically, for each of the plurality of transport blocks, a plurality of parameters of the Iub frame protocol respectively used when the radio base station transmits the user data;
   an evaluation parameter determination unit which obtains a value of the evaluation parameter indicating a communication quality for the each of the plurality of transport blocks, by adding the plurality of numerically expressed parameters;
   a transport block selection unit which selects at least one optimum transport block based on the value of the evaluation parameter for the each of the plurality of transport blocks obtained by the evaluation parameter determination unit; and
   a transport block combining unit which obtains second user data to be transmitted to the network side, by combining the at least one optimum transport block selected by the selection unit.

* * * * *